United States Patent
Nos et al.

(10) Patent No.: US 11,042,654 B2
(45) Date of Patent: Jun. 22, 2021

(54) USING DOMAINS FOR FLEXIBLE DATA ACCESS IN HETEROGENEOUS SYSTEM LANDSCAPES

(71) Applicant: SAP SE, Walldorf (DE)

(72) Inventors: Kathrin Nos, Nussloch (DE); Michael Engler, Walldorf (DE); Matthias Vogel, Saarbrücken (DE)

(73) Assignee: SAP SE, Walldorf (DE)

( * ) Notice: Subject to any disclaimer, the term of this patent is extended or adjusted under 35 U.S.C. 154(b) by 302 days.

(21) Appl. No.: 16/216,400

(22) Filed: Dec. 11, 2018

(65) Prior Publication Data

US 2020/0184087 A1   Jun. 11, 2020

(51) Int. Cl.
*G06F 21/60* (2013.01)
*G06F 21/62* (2013.01)
*H04L 29/06* (2006.01)
*G06F 16/907* (2019.01)

(52) U.S. Cl.
CPC .......... *G06F 21/604* (2013.01); *G06F 16/907* (2019.01); *G06F 21/6218* (2013.01); *H04L 63/102* (2013.01); *H04L 63/105* (2013.01); *G06F 2221/2141* (2013.01); *G06F 2221/2149* (2013.01)

(58) Field of Classification Search
CPC .. G06F 21/604; G06F 16/907; G06F 21/6218; H04L 63/102; H04L 63/105
USPC .......................................................... 726/27
See application file for complete search history.

(56) References Cited

U.S. PATENT DOCUMENTS

| | | | |
|---|---|---|---|
| 7,308,704 B2 | 12/2007 | Vogel et al. | |
| 7,350,237 B2 | 3/2008 | Vogel et al. | |
| 8,762,731 B2 | 6/2014 | Engler et al. | |
| 9,021,552 B2 | 4/2015 | Zlatarev et al. | |
| 9,075,633 B2 | 7/2015 | Nos | |
| 9,116,906 B2 | 8/2015 | Nos et al. | |
| 9,817,645 B2 | 11/2017 | Nos et al. | |
| 9,876,809 B2 | 1/2018 | Nos | |
| 2008/0005161 A1* | 1/2008 | Grealish | H04L 41/22 |
| 2012/0185863 A1* | 7/2012 | Krstic | G06F 21/6281 718/104 |
| 2014/0289391 A1* | 9/2014 | Balaji | H04L 43/04 709/224 |

* cited by examiner

*Primary Examiner* — Kambiz Zand
*Assistant Examiner* — Phuc Pham
(74) *Attorney, Agent, or Firm* — Fish & Richardson P.C.

(57) ABSTRACT

Metadata describing access control capabilities of a database technology resource is received from an access control system. Access restrictions for accessing data of the database resource by users of an application that have a role are received from an application developer. A role maintenance user interface is generated, using the metadata, for assigning the role to users of the application. Attribute values for creating an instance of the role for a user are received, using the role maintenance user interface. The instance of the role is created for the user based on the received attribute values and the access restrictions. A request from the application for the user to access the database resource is received by the access control system when the user is logged into the application. The access restrictions are applied by the access control system in the database resource when the database resource is accessed.

17 Claims, 6 Drawing Sheets

USING DOMAINS FOR FLEXIBLE DATA ACCESS IN HETEROGENEOUS SYSTEM LANDSCAPES

BACKGROUND

Microservice and other types of applications can be written so that data restriction is enforced. For instance, users can be restricted from viewing, changing, and deleting certain data unless they have appropriate authorizations. Authorizations can include, for example, functional authorizations and instance-based authorizations. In some instances, functional authorizations can be based on scopes, which define functionalities that may be granted to users. For example, a given user may be granted access to order-approval functionality. Instance-based authorizations can define which instances of data or resources a given user may be allowed to access. For example, a given user may be granted access only to orders with value that is less than or equal to a predefined amount.

SUMMARY

The present disclosure describes configuration and application of access restrictions. In an implementation, metadata that describes access control capabilities of a database technology resource is received, from an access control system. Access control restrictions for accessing data of the database technology resource by users of an application that have a first role are received, from an application developer. The access control restrictions are specified using the metadata. A role maintenance user interface for assigning the first role to users of the application is generated, using the metadata. Attribute values for creating an instance of the first role for a first user are received, using the role maintenance user interface. The instance of the first role for the first user is created based on the received attribute values and the access control restrictions. A request from the application for the user to access the database technology resource is received by the access control system when the first user is logged into the application. The access control restrictions are applied, by the access control system, in the database technology resource when accessing the database technology resource.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, an application can be decoupled from access control functionality of database technologies. Second, application developers can use a centralized component for implementation of access control for an application. Third, responsibilities for access control declaration, access control implementation, and role maintenance can be distributed to different responsible parties. Fourth, an application developer can declare a subset of access control technologies that may be used by an application. Fifth, an application developer can declare access control functionality needs of an application abstractly without needing to know exact details of how the access control functionality will be implemented.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes configuration and application of access restrictions, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Microservices are a variant of a service-oriented architecture (SOA) style where applications are structured as a collection of modular components (or services). The collection of services are loosely coupled and fine-grained and use lightweight communication protocols. Microservice-based applications can be written in a manner to enforce data restriction(s). For instance, users can be restricted from viewing, changing, and deleting certain data unless they have appropriate authorizations. Authorizations can include, for example, functional authorizations and instance-based authorizations. In some instances, functional authorizations can be based on scopes, which define functionalities that may be granted to users. For example, a given user may be granted access to order-approval functionality. Instance-based authorizations can define which instances of data or resources a given user may be allowed to access. For example, a given user may be granted access only to orders with value that is less than or equal to a predefined amount.

In some implementations, instance-based authorizations can be defined by specifying attributes of instances that are to be made available to a user having a particular role. Access control restrictions can be applied when data is accessed from a resource, so that only those instances that match the specified attributes are returned for a user having the particular role.

In order to avoid an application configuration requiring, in a particular database technology, that the application be coupled to an exact syntax used to apply desired access control restrictions, an application developer can instead define access control for an application using an abstract metadata model. The use of the metadata model can decouple the application and the application developer from specific access control functionality associated with a particular database technology.

Application developers can also use a centralized component provided by access control technology developers for implementation of access control for an application. The centralized component can be configured to be responsible for carrying out, in a particular database technology, access control needs specified by the metadata.

In some implementations, responsibilities for access control declaration, access control implementation, and role maintenance can be distributed to different responsible parties. For example, a technology developer of the centralized system can implement access control without needing to know application functionality. A user interface (UI) developer can also develop role maintenance user interfaces based on the metadata.

Figure 1:
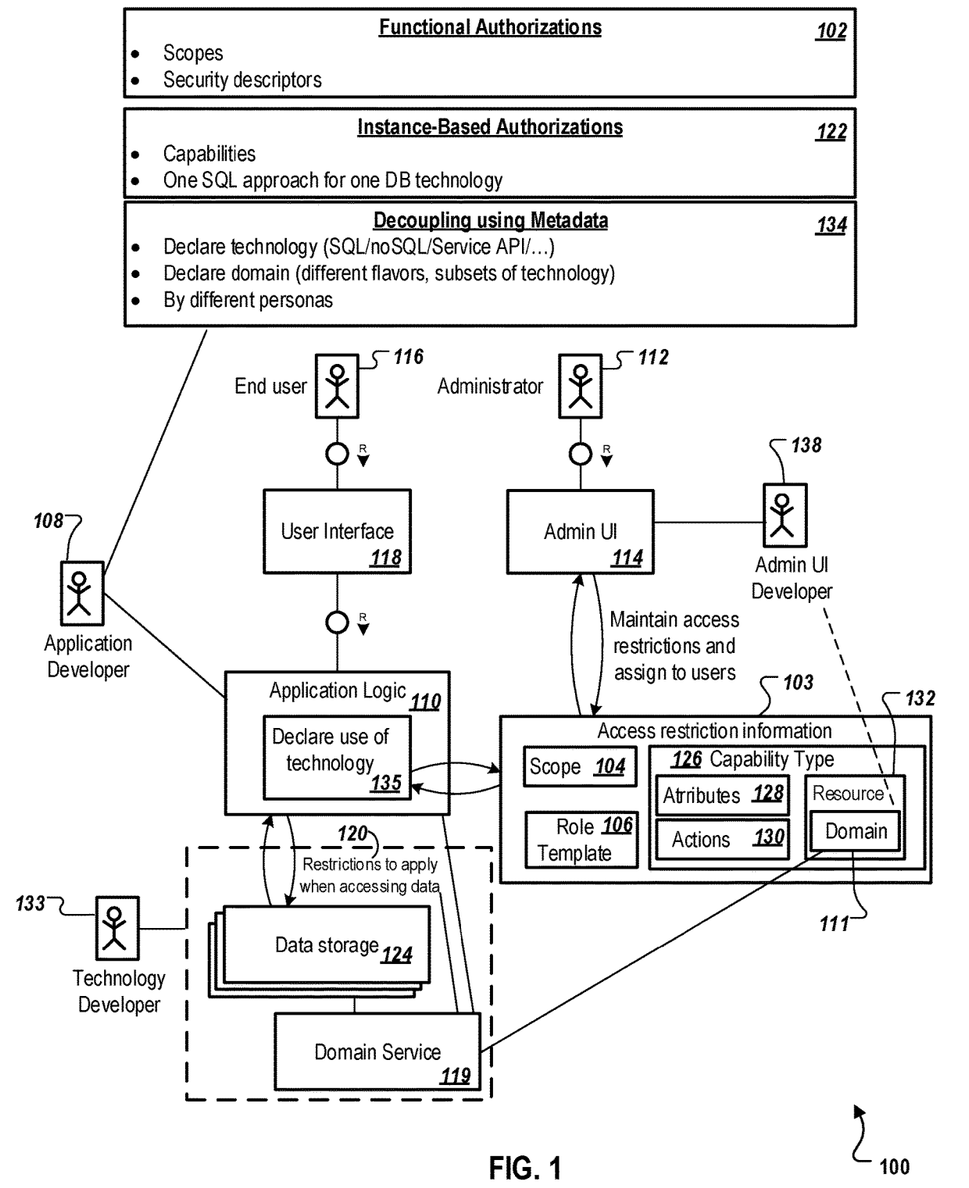
FIG. 1 is a block diagram illustrating an example of a system for configuration and application of access restrictions, according to an implementation of the present disclosure.

FIG. 1 is a block diagram illustrating an example of a system 100 for configuration and application of access restrictions, according to an implementation of the present disclosure. In some implementations, access to resources by application users can be restricted except for access that has been granted through authorizations. In some cases, authorizations can include functional authorizations 102, which can be defined using security descriptors, as access restriction information 103. In a particular example, security descriptors can be defined in a file. A security descriptor file can include scopes 104 and role templates 106.

In some implementations, scopes 104 can be start authorizations for a user, defining whether a user can access an application in general. Scopes 104 can be used to control access to selected parts or services of an application. Scopes 104 can also define sets of functionalities, such as approve or display. A scope 104 can specify whether access to a particular resource is to be granted. Scopes 104 can be bundled in, attached to, or otherwise associated with a role template 106.

In some implementations, role templates 106 can include references to scopes 104 and declare the format of a role which is initialized during an administration process. For instance, where roles include a viewer role and an editor role, the viewer role can be associated with a reading scope and the editor role can be associated with an editing scope and a deletion scope.

An application developer 108 can develop application logic 110 that performs authorization checks, including functional authorizations 102, which have been defined by the application developer 108. For instance, the application developer 108 can write the application logic 110 so that an application checks scopes 104 before doing corresponding operations for which authorization may be needed. As described in following paragraphs, the application developer 108 can model permissions, including scopes, using an abstract domain 111.

A user administrator 112 can create roles based on role templates 106 using administrative user interface(s) 114 provided by a centralized user administration framework. As described in following paragraphs, the administrative user interface(s) can be developed by referring to the domain 111. Roles can be collected in role collections which can be assigned to security groups. Security groups can be used for role assignments to end users that are known to a given identity provider, including an end user 116.

At runtime, the end user 116 can log in to the system 100, and be issued an access token. The access token can include scopes 104 that refer to the role of the end user 116. An application router (not illustrated) can perform authorization checks using scopes 104. In response to a user interaction with an application user interface 118 (or in response to an automated process), the application logic 110 can perform, in a runtime container, other authorization checks, for requested access to particular resources. Although the application logic 110 can include access restriction determination logic that can determine access restrictions 120 for the end user 116 that logs in, with the determined access restrictions 120 being applied when data is accessed from a data storage 124, the application can instead use a declarative approach, as described in following paragraphs, which defers access control restriction determination to a centralized domain service 119.

Functional authorizations can be appropriate for certain types of authorizations, but may not enable specific-enough conditions for other desired authorization checks. For instance, for some applications, authorizing a user to be able to create orders may be sufficient. However, for other applications, application requirements may include that only certain users should be able to create particular types of orders. For example, application requirements may be that some users should be able to order low-valued items (for example, a cost below US $100), and other users should be able to order items having higher values. Accordingly, the system 100 can support instance-based authorizations.

In instance-based authorizations, instances of an object can be grouped by specifying properties that are applicable for actions on the object instances. For example, cars can be grouped by a country in which they are produced, a responsibility for each country can be assigned to a manager, and each manager can be responsible for one or for several countries. To enable users to work on exactly the objects for which they are responsible, a grouping criteria can be assigned to users. For example, there can be a first manager responsible for a country with country code "US" and a second manager responsible for countries with country codes of "DE", "CH", and "A".

In some implementations, instance-based authorizations can define not only what instances are authorized to be accessed, but also what operations or actions are allowed on the authorized instances. Example operations are "approve", "maintain", "read", or "write". Attributes and actions for an instance-based authorization can be represented as a capability type 126 that can specify both attributes 128 and actions 130, as well as a resource 132 for which authorizations are being defined. A resource 132 can be a database table, a database view, or a service, to name a few examples. A resource 132 can specify persistence information for instance data. At runtime a capability can be instantiated based on a capability type 126.

Attributes 128 of a capability can be used to specify which instances of a resource 132 a user may access. The actions 130 associated with a particular capability can specify what a user may perform on resource instances that are identified by the capability's attributes. In some implementations, a definition of an instance-based authorization can positively state, using attribute condition(s), which instances of a resource 132 authorization is granted to a user, which in turn can indicate that the user does not have access to other instances not matching the attribute condition(s).

In some instances, capabilities can be assigned by the administrator 112 to roles through use of the administrative user interface 114. In some implementations, role assignment for a particular capability can involve providing information that defines which values for certain capability attributes 128 are applicable for certain actions. Defining which instances and which actions are authorized can enable flexible instance-based authorizations and assignment to roles. For example, an instance-based authorization can grant authority to a user to read information about all cars in Europe and to modify information for only cars of brand "Volkswagen" located in the city of "Wolfsburg".

In some implementations, multiple capabilities can be assigned to a role associated with a user. For example, a capability type for "Sales Orders" can include the attributes "country" and "plant". A role can be assigned so that a particular user can view all sales orders in Germany, but may only be permitted to edit sales orders assigned to a plant "X". In this example, two capabilities can be assigned to the role which is assigned to the user, including a first role that includes a "read" action for country "Germany" and a second role that includes a "write" action for plant "X". Another user may have similar responsibilities, but may be responsible for plant "Y", not for plant "X". In this case, the other user can be assigned the same capability for "read" and country "Germany", and another capability for "write" for plant "Y".

The administrator 112 can use the administrative user interface 114 to set up and assign, to users, roles that are associated with instance-based authorizations. By entering values in the administrative user interface 114 for attributes 128 when creating or maintaining a capability, the administrator 112 can express how to determine objects on which the user may perform specified actions 130, thereby defining which resource instances reflect the user's capabilities. The administrative user interface 114 can enable the administrator 112 to enter or select attribute values associated with an attribute condition. For example, the administrative user interface 114 can include an ability for the administrator 112 to specify a particular order value amount, for a role that is meant to restrict user access to orders greater than a particular threshold amount.

In some implementations, input from the administrative user interface 114, including attribute values, for instance-based authorizations, can be stored in the access restriction information 103. As with functional authorizations 102, instance-based authorizations 122 can be stored in security descriptor file(s).

Application logic 110 can also be coded to use instance-based authorizations 1220 (and, in some cases, in addition to functional authorizations 102). The access restriction information 103 that defines instance-based authorizations 1220 (and, in some cases, functional authorizations 102) can be used by the access restriction determination logic 120 when access restrictions are determined or applied for a given user. Application of the access restrictions ensures that the end user 116 is only able to access not only authorized applications and application services, but also only specific types of data, object instances, and other resources for which the end user 116 has been authorized.

In some implementations, instance-based authorization checks can be implemented in the access restrictions 120. In some cases, implementation of an instance-based authorization check can depend on the type of data storage 124 that is used by the application. For instance, in a SQL database, an instance-based authorization can be implemented by adjusting a SQL statement to include (or to extend) a WHERE clause to include the instance-based condition(s) included in the capability of the instance-based authorization 121. For instance, for the previously-discussed order example, a WHERE clause condition of "order_value<100" can be automatically added, by the access restriction enforcement technologies 122, to a SQL statement that the application logic 134 is configured to send to the data storage 124.

SQL syntax can define, and in some cases, limit, the types of terms and term combinations that the application developer 108 may use to specify an access restriction. Other data storage technologies may use other approaches for data retrieval and/or access restrictions, which may include other type of syntax, which may enable other types of terms or term combinations than can be specified with SQL (or with other syntaxes).

While the application developer 108 can implement the access restrictions 120, doing so may couple the application logic 110 to particular access control approaches of the particular data storage 124 being used by the application. Such coupling can make it harder for the application to be configured at a later time to use a different type/version of the particular data storage 124.

Additionally, it may not be desirable for the application developer 108 to be required to serve as both an application-level expert and to know access control details of one or more particular data storage technologies. The application developer 108 may wish to have flexibility regarding access restriction specification and may desire to be able to specify access restrictions using options offered by any data storage technology, rather than to be limited by options offered by a specific data storage technology. For example, a particular application may have specific requirement(s) that may not be able to be met by any one particular data storage technology.

Accordingly, it can be beneficial to centralize access control implementation and to enable application developers 108 to express access control intentions without being tightly bound to a specific data storage technology. In these instances, a technology developer 133 of a central technical group can implement, in the centralized domain service 119, access control for specific data storage technologies, which removes a burden for the application developers 108 to understand low-level details for access control. Rather than code access control restrictions directly, an application developer 108 can model access control restrictions using the domain 111 (for example, by using a modeling language that can be higher-level and more abstract than specific approaches for access control implementation). A metadata approach 134 that uses the domain 111 can decouple the application from specific access control details in specific data storage technologies.

In some implementations, the domain 111 is associated with a metadata model that can be used by the application developer 108 to describe, at an abstract level, type(s) of access control expressions that a particular resource 132 supports. The application developer 108 can declare access control intentions of an application, using the domain 111, at design time (for example, as represented by a declarative portion 135 of the application logic 110). In some cases, the application can declare use of and access the domain 111. By using the domain 111, the application developer 108 can model authorizations at an abstract level without needing to understand exact details of an underlying data storage technology. The application developer 108 can model restrictions to describe desired data access for the application. As a result, the application developer 108 need not know or be required to specify exact details for how desired restrictions are to be enforced at the data storage level.

In some implementations, the domain 111 can be a metadata description of information that is supported by an underlying data storage resource 132 that can be used to define instance-based authorizations. The domain 111 can be part of a model that also includes scopes 104 and capability types 126. A capability type 126 can have a property that refers to a resource definition for a resource 132. The resource definition for the resource 132 can have a property that refers to the domain 111. The domain 111 can have a version identifier, which can be modified when a new version the domain 111 is introduced. The version identifier can identify which version of the domain 111 is applicable in a given context.

By referring to metadata, the application developer 108 need not implement actual code to be executed by the data storage 124 for access control. Rather, the application developer 108 can model access control intentions using the metadata model. In some cases, the application developer 108 can provide descriptors that describe, for example, scopes 104, role templates 106, capability types 126, and the domain 111. At run time, when an authorization check is to be applied, the application can call the centralized domain service 119 that can access definitions for a resource (for example, a table or a view) and the modeled descriptors, and implement the access restrictions 124 by creating actual statements (for example, modified SQL statement(s)) that will be executed by the data storage 124.

In some implementations, the centralized domain service 119 can use values associated with the user, including the user's role, to generate access control statements that are executable by the data storage 124. Data returned to the application can be restricted by authorizations that are relevant for the user. The centralized domain service 119, rather than the application itself, can be responsible for ensuring that only authorized data is returned. Application of the access restrictions 120 by the centralized domain service ensures that the end user 116 is only able to access not only authorized applications and application services, but also only specific types of data, object instances, and other resources for which the end user 116 has been authorized.

Enabling use of a particular data storage technology for access restriction can involve administrative activities, such as role definition by the administrator 112, enabling future auditing of security critical events, and development of the administrative user interfaces 114 for enabling input of parameters used in access restriction configurations. As a particular example, application developers may want to be able to use new data storage technologies before administrative work is completed. Since a centralized technical group may have a backlog, for example, of requests for adapting a centralized framework to support access restrictions on new combinations of languages and data storage platforms, the central technical group can, instead, provide the centralized framework for central composition of roles and centralized auditing. The application developer 108 can then model access control restrictions, using the domain 111, while specific access control approaches are being implemented by the central technology group, since the modeling language may be independent from specific data storage technologies.

Use of the domain 111 can also remove other types of coupling. For example, if role templates 106 are changed, or new role templates are added, the administrative user interface 114 may need to be modified or extended to support the new or changed role templates, for supporting creation and assignment of those new or changed role templates. For instance, a particular type of role may have been configured to enable access to orders of less than a certain amount, as described previously. A new organizational requirement may cause a need for that role to be modified to reflect that users in that role are assigned to a particular region. For example, the organization may want to be able to create role instances so that a first user may be able to access orders less than $100 that originated in Europe, whereas a second user should be able to access orders less than $500 that originated in North America. When new or changed roles have new access restriction requirements, the administrative user interface 114 may need to be changed so that the administrator 112 can enter or select a particular value threshold, or enter or select a particular region, for example. An administrative user interface developer 138 can develop the administrative user interface 114 and make changes to the administrative user interface 114 when roles are added or changed, to implement functionality that is to be made available to the administrator 112

Rather than requiring an administrative user interface developer 138 to know low-level detail for exactly how to express access restrictions in a particular data storage technology, the administrative user interface developer 138 can instead build an administrative user interface 114 based on information in the domain 111. In this way, the administrative user interface developer 134 does not need to know exact details of how particular access restrictions 124 are implemented. In these implementations, the administrative user interface developer 138 can refer to the domain 111 to determine permitted terms that may be used for access control for the associated resource 132. The domain 111 can be configured to define which terms can be used for capability maintenance for the resource 132, such as for entering or combining values for attributes 128. The domain 111 can also describe, at an abstract level, possibilities for assignment of authorizations to users. The administrative user interface developer 138 can build or modify the administrative user interface 114 based on the metadata specified by the domain 111. As can be seen, the administrative user interface developer 138 does not need to know exact technical details of the underlying data storage technology 124. As described in following figures, the administrative user interface(s) 114 can be automatically generated by a computer process, using information in the domain 111, in addition to or alternatively to manual development by the administrative user interface developer 138.

Figure 2:
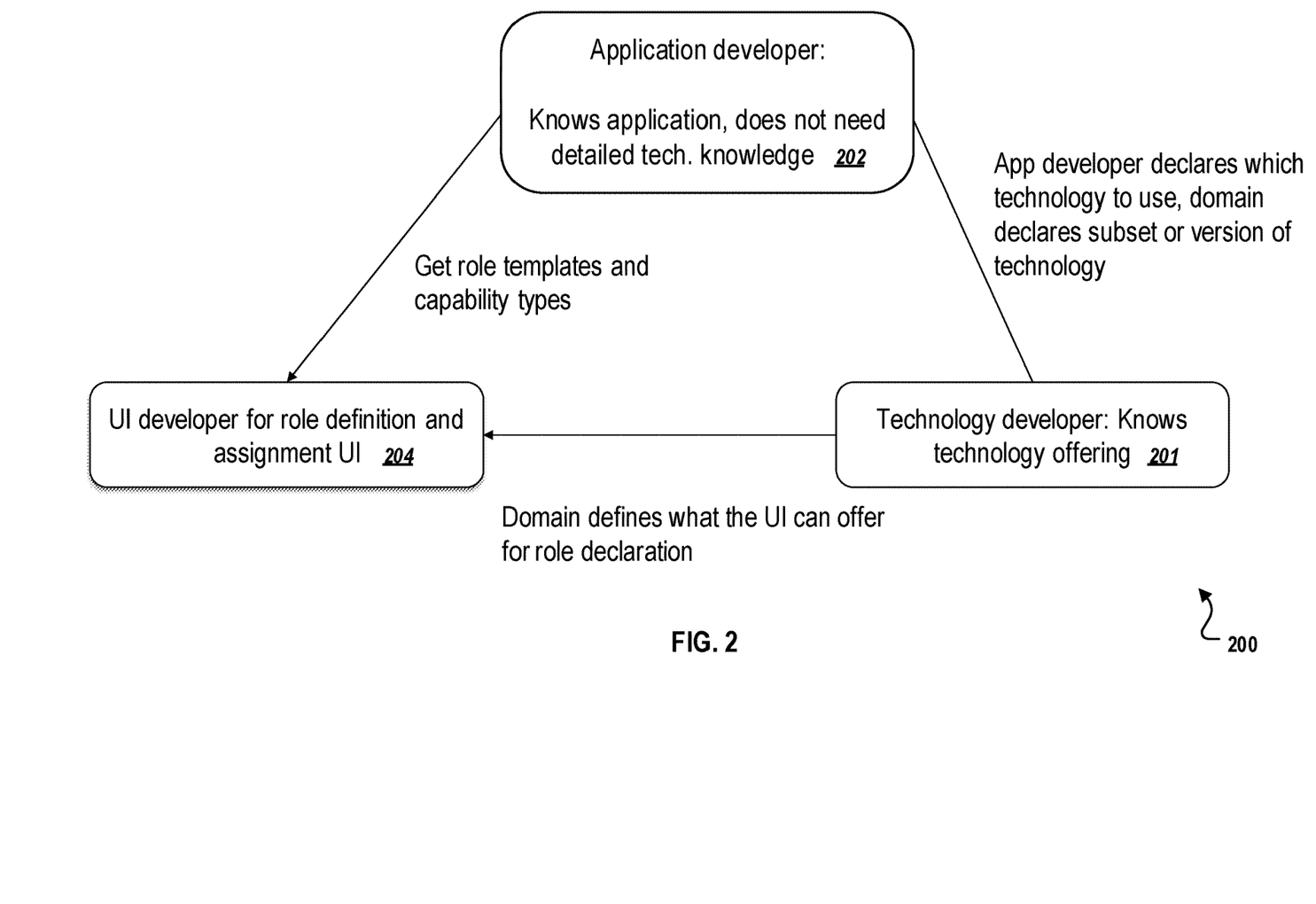
FIG. 2 is a diagram of a model that illustrates various personas related to configuring access control for an application, according to an implementation of the present disclosure.

FIG. 2 is a block diagram of a model 200 that illustrates various personas related to configuring access control for an application, according to an implementation of the present disclosure. Using a metadata approach with domains can result in distribution of responsibilities when access control is configured. A technology developer 201 can be someone who knows access control technology and who can create, in an overall domain, a metadata model for use by an application developer 202 and a user interface developer 204. The application developer 202 can be someone who knows application details, but who does not need to know detailed knowledge about access control technology. The application developer can declare, by specifying a second domain, which access control technologies may be used by an application. The application may use a subset of access control technologies described by domain(s) created by technology developer(s) 201. The subset can be specified by the application developer 202 in a second domain. The user interface developer 204 can be someone who develops user interfaces for role definition and role assignment. The user interface developer can build user interfaces based on information specified in the domain.

Figure 3:
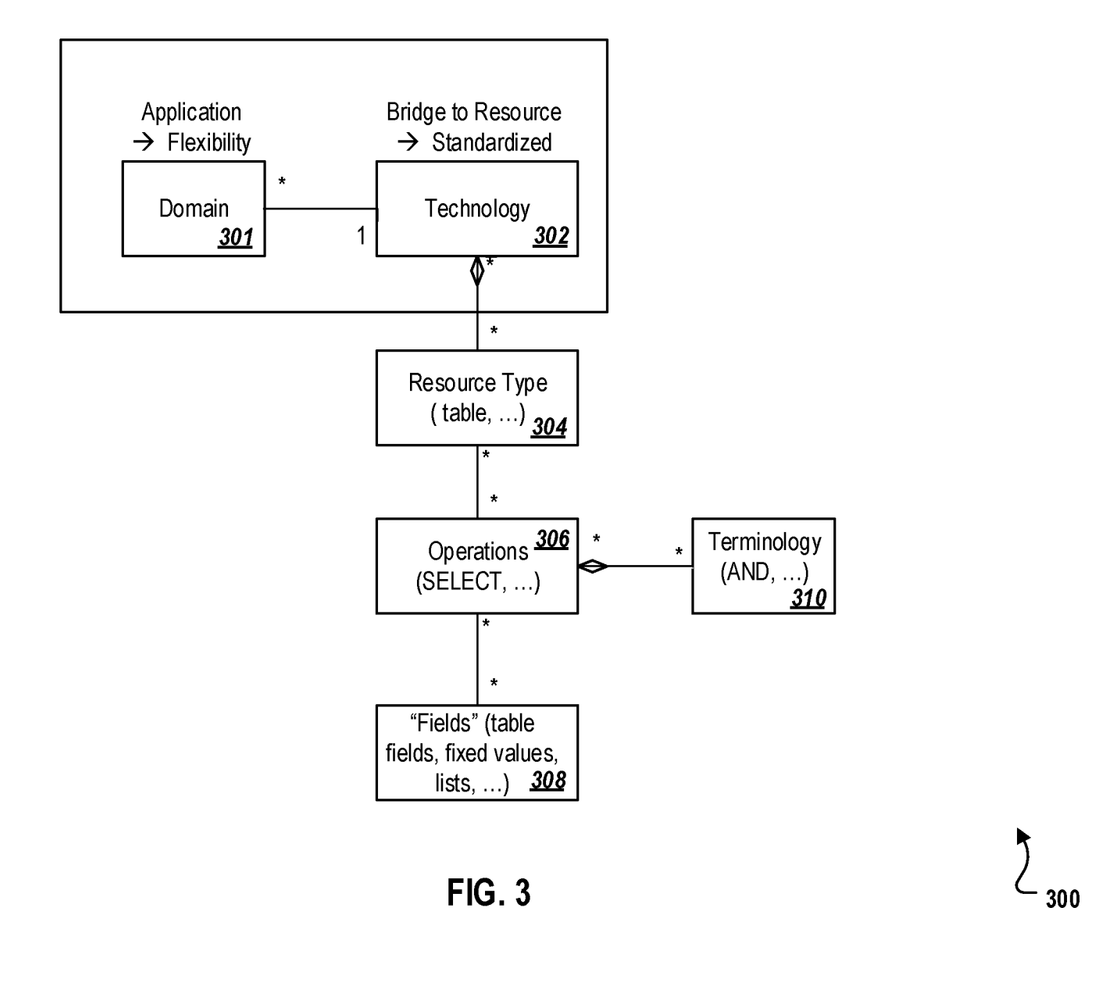
FIG. 3 illustrates an example of a metadata model for specifying capabilities of an access control technology, according to an implementation of the present disclosure.

FIG. 3 illustrates an example of a metadata model 300 for specifying capabilities of an access control technology, according to an implementation of the present disclosure. A domain 301 can refer to a particular access control technology 302. An access control technology can be implemented in one or more resources, where each resource has a particular resource type 304. A resource type 304 can be, for example, a database table, a database view, or a service that provides access control. Each resource type 304 can allow a set of operations 306. For example, if a resource type 304 is a database view, the operations 306 can include a SELECT statement. If a resource type 304 is a database table, the operations 306 can include SELECT, INSERT, UPDATE, and DELETE statements.

The syntax of a particular operation 306 can have a terminology 308 that defines how the operation 306 may access a resource of the resource type 304. For example, with a SELECT statement, a WHERE clause can specify which conditions are to be applied when the SELECT statement is executed, and the conditions can be expressed by terms such as AND, OR, or IN. For an operation 306, operation parameter options 310 can be specified in the metadata model 300. For example, with a SELECT statement, one or more conditions can be specified, with each condition having a left side (such as, specifying a field on which the condition is applied) and a right side (such as, specifying what the field contents should be compared to, which can be a fixed value, a list, or an expression containing a wildcard).

An application developer can define capabilities that comply with the metadata model 300. An administrator can assign capabilities to users using roles. At runtime, when an application with a currently logged in user wants to access a resource of the resource type 304, capabilities associated with the role of the user are retrieved and attributes of the capabilities are applied to the resource access of the user, such as by creating conditions using the attributes and adding the conditions to a WHERE clause of a SELECT statement. Even if an application query was configured to request all the data of a resource, the role assignment of the user can ensure that an appropriate restriction is added to the query.

Figure 4:
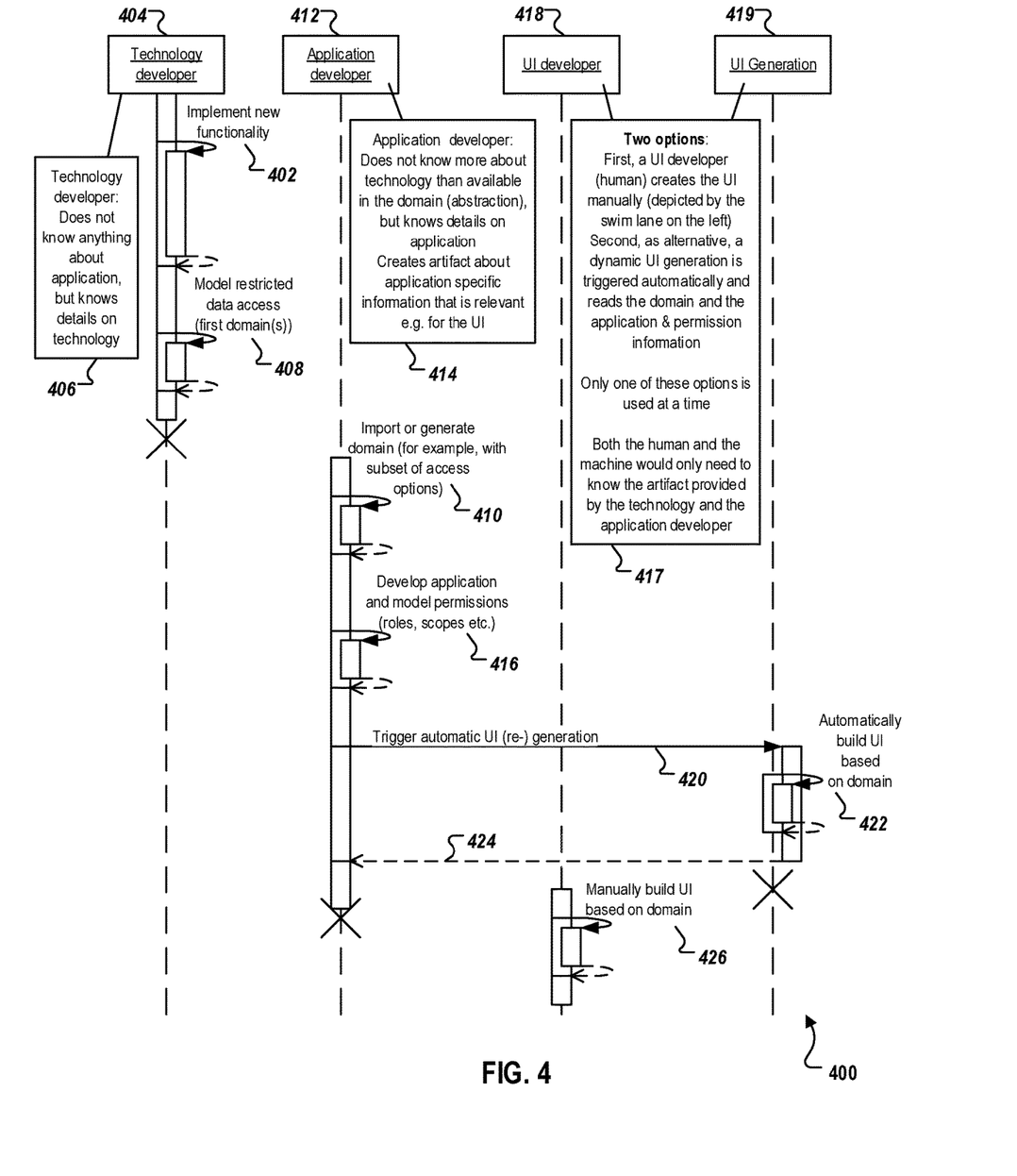
FIG. 4 is a flowchart illustrating an example of a computer-implemented method 400 for modeling and applying access control restrictions, according to an implementation of the present disclosure.

FIG. 4 is a flowchart illustrating an example of a computer-implemented method 400 for modeling and applying access control restrictions, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, a technology developer 404 implements new functionality for access control in a particular data storage technology. As indicated by a note 406, the technology developer may not know anything about application features of specific end-user applications, but knows details on a particular access control technology that may be used by applications. From 402, method 400 proceeds to 408.

At 408, the technology developer models restricted access to resources provided by a data storage technology. From 408, method 400 proceeds to 410.

At 410, an application developer 412 imports or generates a domain with a subset of access options. The domain imported or generated by the application developer 412 can be a declaration of which access restrictions of domain provided by the technology developer 404 may be applicable to the application. As indicated by note 414, the application developer 412 may not know more about a particular access control technology than what is specified abstractly in the domain for the technology, but knows abstract access control requirements required by the application. From 410, method 400 proceeds to 416.

At 416, the application developer 412 models application permission needs by creating artifact(s) by referring to the domain created by the technology developer 404. As indicated by note 417, once an application developer has modeled access restrictions for an application, a user interface for assigning roles to users of the application can be either manually or automatically generated. For either a manual or automatic approach, either a user interface developer 418 or a user interface generation component 419 can build a role maintenance user interface using artifacts provided by the technology developer and the application developer 412. From 416, method 400 proceeds to 420.

At 420, automatic user interface generation (or re-generation) for a role maintenance user interface is triggered. From 420, method 400 proceeds to 422.

At 422, in response to the user interface generation trigger, the user interface generation component 419 automatically builds the role maintenance user interface based on the domain information provided by the technology developer 404 and the application developer 412. From 422, method 400 proceeds to 424.

At 424, a user interface generation result is provided to the application developer 412. From 424, method 400 proceeds to 426.

At 426, as an alternative approach for generating the role maintenance user interface, the user interface developer 418 can manually build the role maintenance user interface based on the domain information provided by the technology developer 404 and the application developer 412. After 426, method 400 can stop.

Figure 5:
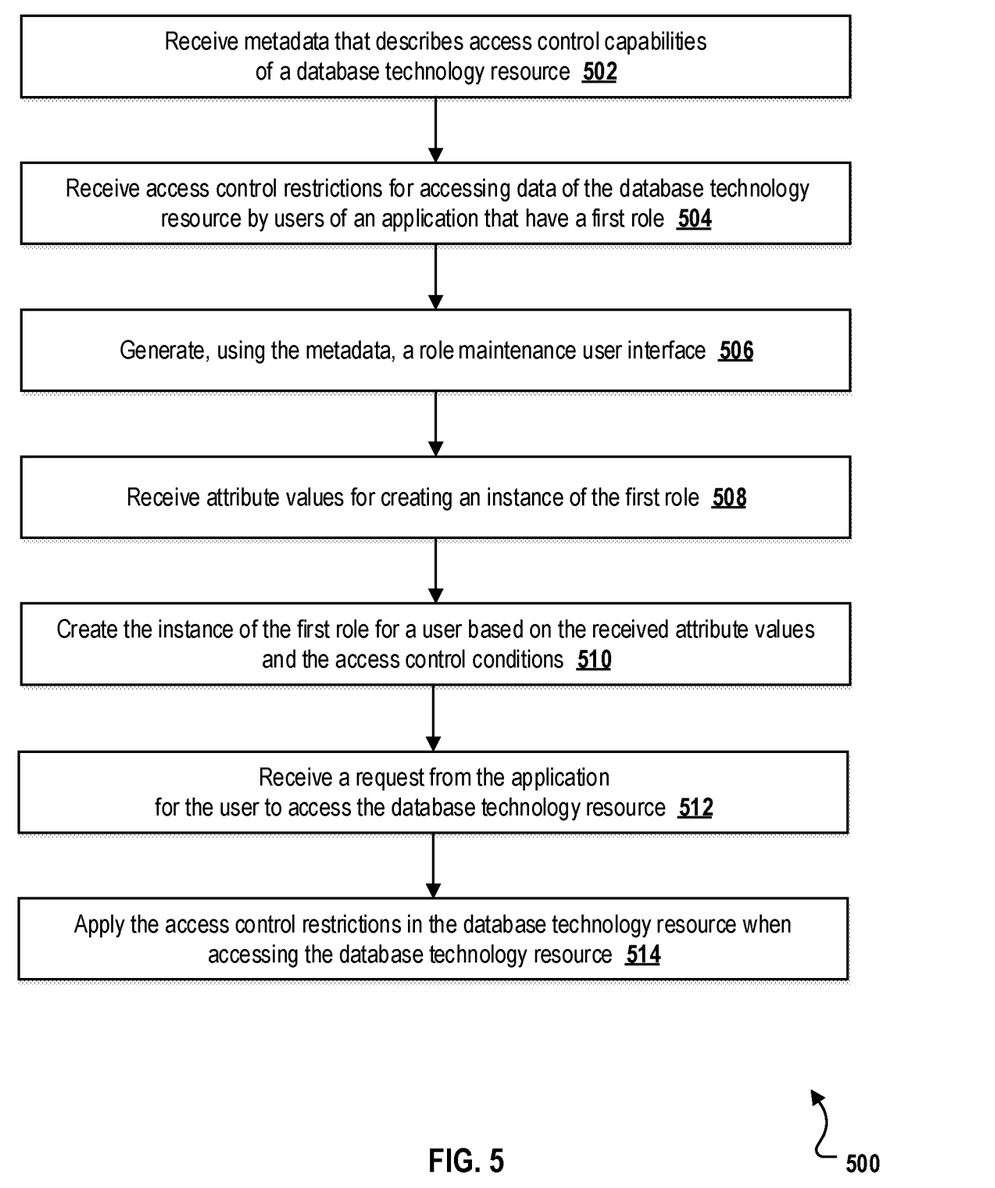
FIG. 5 is a flowchart illustrating an example of a computer-implemented method for configuration and application of access restrictions, according to an implementation of the present disclosure.

FIG. 5 is a flowchart illustrating an example of a computer-implemented method 500 for configuration and application of access restrictions, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, metadata that describes access control capabilities of a database technology resource is received, from an access control system. The metadata can be defined by a technology developer of a centralized framework. From 502, method 500 proceeds to 504.

At 504, access control restrictions for accessing data of the database technology resource by users of an application that have a first role are received from an application developer. The access control restrictions are specified using the metadata. The technology developer need not be aware of the access control restrictions used by the application (the metadata declared by the application developer or the actual access control values specified by an administrator). From 504, method 500 proceeds to 506.

At 506, a role maintenance user interface for assigning the first role to users of the application is generated, using the metadata. For example, a user interface developer can use the metadata to manually develop the role maintenance user interface. As another example, the role maintenance user interface can be automatically generated by a computer process based on the metadata. From 506, method 500 proceeds to 508. The role maintenance user interface can be automatically generated based on the metadata or can be manually generated by a user interface developer.

At 508, attribute values for creating an instance of the first role for a first user are received, using the role maintenance user interface. From 508, method 500 proceeds to 510.

At 510, the instance of the first role for the first user is created based on the received attribute values and the access control restrictions. From 510, method 500 proceeds to 512.

At 512, a request is received from the application, by the access control system and when the first user is logged into the application, for the user to access the database technology resource. From 512, method 500 proceeds to 514.

At 514, the access control restrictions are applied in the database technology resource when accessing the database technology resource. Applying the access control restrictions can include generating access control statements using the attribute values and applying the access control statements to the database technology resource. In examples, the access control statements are not included in the application and the application developer is not aware of exact details regarding which access control statements are applied to the database technology resource. Additionally, the user interface developer need not be aware of the access control statements applied to the database technology resource. From 514, method 500 can stop.

Figure 6:
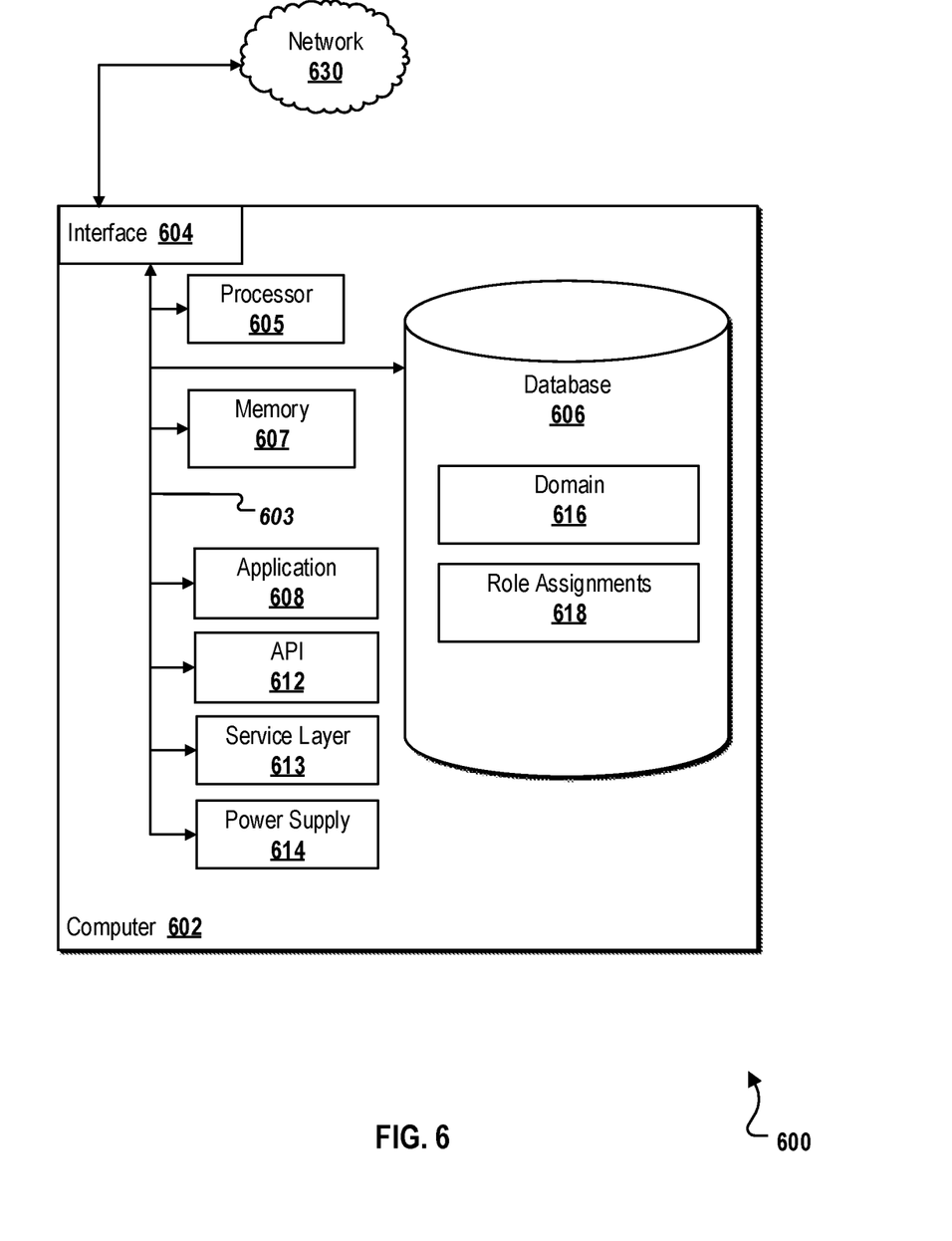
FIG. 6 is a block diagram illustrating an example of a computer-implemented system used to provide computational functionalities associated with described algorithms, methods, functions, processes, flows, and procedures, according to an implementation of the present disclosure.

FIG. 6 is a block diagram illustrating an example of a computer-implemented System 600 used to provide computational functionalities associated with described algorithms, methods, functions, processes, flows, and procedures, according to an implementation of the present disclosure. In the illustrated implementation, System 600 includes a Computer 602 and a Network 630.

The illustrated Computer 602 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 602 can include an input device, such as a keypad, keyboard, or touch screen, or a combination of input devices that can accept user information, and an output device that conveys information associated with the operation of the Computer 602, including digital data, visual, audio, another type of information, or a combination of types of information, on a graphical-type user interface (UI) (or GUI) or other UI.

The Computer 602 can serve in a role in a distributed computing system as, for example, a client, network component, a server, or a database or another persistency, or a combination of roles for performing the subject matter described in the present disclosure. The illustrated Computer 602 is communicably coupled with a Network 630. In some implementations, one or more components of the Computer 602 can be configured to operate within an environment, or a combination of environments, including cloud-computing, local, or global.

At a high level, the Computer 602 is an electronic computing device operable to receive, transmit, process, store, or manage data and information associated with the described subject matter. According to some implementations, the Computer 602 can also include or be communicably coupled with a server, such as an application server, e-mail server, web server, caching server, or streaming data server, or a combination of servers.

The Computer 602 can receive requests over Network 630 (for example, from a client software application executing on another Computer 602) and respond to the received requests by processing the received requests using a software application or a combination of software applications. In addition, requests can also be sent to the Computer 602 from internal users (for example, from a command console or by another internal access method), external or third-parties, or other entities, individuals, systems, or computers.

Each of the components of the Computer 602 can communicate using a System Bus 603. In some implementations, any or all of the components of the Computer 602, including hardware, software, or a combination of hardware and software, can interface over the System Bus 603 using an application programming interface (API) 612, a Service Layer 613, or a combination of the API 612 and Service Layer 613. The API 612 can include specifications for routines, data structures, and object classes. The API 612 can be either computer-language independent or dependent and refer to a complete interface, a single function, or even a set of APIs. The Service Layer 613 provides software services to the Computer 602 or other components (whether illustrated or not) that are communicably coupled to the Computer 602. The functionality of the Computer 602 can be accessible for all service consumers using the Service Layer 613. Software services, such as those provided by the Service Layer 613, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 602, alternative implementations can illustrate the API 612 or the Service Layer 613 as stand-alone components in relation to other components of the Computer 602 or other components (whether illustrated or not) that are communicably coupled to the Computer 602. Moreover, any or all parts of the API 612 or the Service Layer 613 can be implemented as a child or a sub-module of another software module, enterprise application, or hardware module without departing from the scope of the present disclosure.

The Computer 602 includes an Interface 604. Although illustrated as a single Interface 604, two or more Interfaces 604 can be used according to particular needs, desires, or particular implementations of the Computer 602. The Interface 604 is used by the Computer 602 for communicating with another computing system (whether illustrated or not) that is communicatively linked to the Network 630 in a distributed environment. Generally, the Interface 604 is operable to communicate with the Network 630 and includes logic encoded in software, hardware, or a combination of software and hardware. More specifically, the Interface 604 can include software supporting one or more communication protocols associated with communications such that the Network 630 or hardware of Interface 604 is operable to communicate physical signals within and outside of the illustrated Computer 602.

The Computer 602 includes a Processor 605. Although illustrated as a single Processor 605, two or more Processors 605 can be used according to particular needs, desires, or particular implementations of the Computer 602. Generally, the Processor 605 executes instructions and manipulates data to perform the operations of the Computer 602 and any algorithms, methods, functions, processes, flows, and procedures as described in the present disclosure.

The Computer 602 also includes a Database 606 that can hold data for the Computer 602, another component communicatively linked to the Network 630 (whether illustrated or not), or a combination of the Computer 602 and another component. For example, Database 606 can be an in-memory or conventional database storing data consistent with the present disclosure. In some implementations, Database 606 can be a combination of two or more different database types (for example, a hybrid in-memory and conventional database) according to particular needs, desires, or particular implementations of the Computer 602 and the described functionality. Although illustrated as a single Database 606, two or more databases of similar or differing types can be used according to particular needs, desires, or particular implementations of the Computer 602 and the described functionality. While Database 606 is illustrated as an integral component of the Computer 602, in alternative implementations, Database 606 can be external to the Computer 602. As illustrated, the Database 606 holds the previously described domain 616 and role assignments 618.

The Computer 602 also includes a Memory 607 that can hold data for the Computer 602, another component or components communicatively linked to the Network 630 (whether illustrated or not), or a combination of the Computer 602 and another component. Memory 607 can store any data consistent with the present disclosure. In some implementations, Memory 607 can be a combination of two or more different types of memory (for example, a combination of semiconductor and magnetic storage) according to particular needs, desires, or particular implementations of the Computer 602 and the described functionality. Although illustrated as a single Memory 607, two or more Memories 607 or similar or differing types can be used according to particular needs, desires, or particular implementations of the Computer 602 and the described functionality. While Memory 607 is illustrated as an integral component of the Computer 602, in alternative implementations, Memory 607 can be external to the Computer 602.

The Application 608 is an algorithmic software engine providing functionality according to particular needs, desires, or particular implementations of the Computer 602, particularly with respect to functionality described in the present disclosure. For example, Application 608 can serve as one or more components, modules, or applications. Further, although illustrated as a single Application 608, the Application 608 can be implemented as multiple Applications 608 on the Computer 602. In addition, although illustrated as integral to the Computer 602, in alternative implementations, the Application 608 can be external to the Computer 602.

The Computer 602 can also include a Power Supply 614. The Power Supply 614 can include a rechargeable or non-rechargeable battery that can be configured to be either user- or non-user-replaceable. In some implementations, the Power Supply 614 can include power-conversion or management circuits (including recharging, standby, or another power management functionality). In some implementations, the Power Supply 614 can include a power plug to allow the Computer 602 to be plugged into a wall socket or another power source to, for example, power the Computer 602 or recharge a rechargeable battery.

There can be any number of Computers 602 associated with, or external to, a computer system containing Computer 602, each Computer 602 communicating over Network 630. Further, the term "client," "user," or other appropriate terminology can be used interchangeably, as appropriate, without departing from the scope of the present disclosure. Moreover, the present disclosure contemplates that many users can use one Computer 602, or that one user can use multiple computers 602.

Described implementations of the subject matter can include one or more features, alone or in combination. For example, in a first implementation, a computer-implemented method includes: receiving, from an access control system, metadata that describes access control capabilities of a database technology resource; receiving, from an application developer, access control restrictions for accessing data of the database technology resource by users of an application that have a first role, wherein the access control restrictions are specified using the metadata; generating, using the metadata, a role maintenance user interface for assigning the first role to users of the application; receiving, using the role maintenance user interface, attribute values for creating an instance of the first role for a first user; creating the instance of the first role for the first user based on the received attribute values and the access control restrictions; receiving, by the access control system and when the first user is logged into the application, a request from the application for the user to access the database technology resource; and applying, by the access control system, the access control restrictions in the database technology resource when accessing the database technology resource.

The foregoing and other described implementations can each, optionally, include one or more of the following features:

A first feature, combinable with any of the following features, wherein the applying includes generating access control statements using the attribute values and applying the access control statements to the database technology resource.

A second feature, combinable with any of the previous or following features, wherein the application developer is not aware of the access control statements applied to the database technology resource.

A third feature, combinable with any of the previous or following features, wherein the access control statements are not included in the application.

A fourth feature, combinable with any of the previous or following features, wherein the role maintenance user interface is automatically generated based on the metadata.

A fifth feature, combinable with any of the previous or following features, wherein the role maintenance user interface is manually generated by a user interface developer.

A sixth feature, combinable with any of the previous or following features, wherein the user interface developer is not aware of the access control statements applied to the database technology resource.

A seventh feature, combinable with any of the previous or following features, wherein the metadata is defined by a technology developer of a centralized framework.

An eighth feature, combinable with any of the previous or following features, wherein the technology developer is not aware of the access control restrictions used by the application.

In a second implementation, a non-transitory, computer-readable medium stores one or more instructions executable by a computer system to perform operations comprising: receiving, from an access control system, metadata that describes access control capabilities of a database technology resource; receiving, from an application developer, access control restrictions for accessing data of the database technology resource by users of an application that have a first role, wherein the access control restrictions are specified using the metadata; generating, using the metadata, a role maintenance user interface for assigning the first role to users of the application; receiving, using the role maintenance user interface, attribute values for creating an instance of the first role for a first user; creating the instance of the first role for the first user based on the received attribute values and the access control restrictions; receiving, by the access control system and when the first user is logged into the application, a request from the application for the user to access the database technology resource; and applying, by the access control system, the access control restrictions in the database technology resource when accessing the database technology resource.

The foregoing and other described implementations can each, optionally, include one or more of the following features:

A first feature, combinable with any of the following features, wherein the applying includes generating access control statements using the attribute values and applying the access control statements to the database technology resource.

A second feature, combinable with any of the previous or following features, wherein the application developer is not aware of the access control statements applied to the database technology resource.

A third feature, combinable with any of the previous or following features, wherein the access control statements are not included in the application.

A fourth feature, combinable with any of the previous or following features, wherein the role maintenance user interface is automatically generated based on the metadata.

A fifth feature, combinable with any of the previous or following features, wherein the role maintenance user interface is manually generated by a user interface developer.

A sixth feature, combinable with any of the previous or following features, wherein the user interface developer is not aware of the access control statements applied to the database technology resource.

A seventh feature, combinable with any of the previous or following features, wherein the metadata is defined by a technology developer of a centralized framework.

An eighth feature, combinable with any of the previous or following features, wherein the technology developer is not aware of the access control restrictions used by the application.

In a third implementation, a computer-implemented system comprises one or more computers and one or more computer memory devices interoperably coupled with the one or more computers that have tangible, non-transitory, machine-readable media storing one or more instructions. The instructions, when executed by the one or more computers, perform one or more operations comprising: receiving, from an access control system, metadata that describes access control capabilities of a database technology resource; receiving, from an application developer, access control restrictions for accessing data of the database technology resource by users of an application that have a first role, wherein the access control restrictions are specified using the metadata; generating, using the metadata, a role maintenance user interface for assigning the first role to users of the application; receiving, using the role maintenance user interface, attribute values for creating an instance of the first role for a first user; creating the instance of the first role for the first user based on the received attribute values and the access control restrictions; receiving, by the access control system and when the first user is logged into the application, a request from the application for the user to access the database technology resource; and applying, by the access control system, the access control restrictions in the database technology resource when accessing the database technology resource.

The foregoing and other described implementations can each, optionally, include one or more of the following features:

A first feature, combinable with any of the following features, wherein the applying includes generating access control statements using the attribute values and applying the access control statements to the database technology resource.

A second feature, combinable with any of the previous or following features, wherein the application developer is not aware of the access control statements applied to the database technology resource.

A third feature, combinable with any of the previous or following features, wherein the access control statements are not included in the application.

A fourth feature, combinable with any of the previous or following features, wherein the role maintenance user interface is automatically generated based on the metadata.

A fifth feature, combinable with any of the previous or following features, wherein the role maintenance user interface is manually generated by a user interface developer.

A sixth feature, combinable with any of the previous or following features, wherein the user interface developer is not aware of the access control statements applied to the database technology resource.

A seventh feature, combinable with any of the previous or following features, wherein the metadata is defined by a technology developer of a centralized framework.

An eighth feature, combinable with any of the previous or following features, wherein the technology developer is not aware of the access control restrictions used by the application.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
receiving, from an access control system, metadata that describes access control capabilities of a database technology resource, wherein the metadata is from a metadata model that describes access control capabilities of different types of database technology resources;
receiving, from an application developer, declarative access control restrictions for accessing data of the database technology resource by users of an application that have a first role, wherein the declarative access control restrictions are specified using the metadata and are different from different types of executable access controls statements used by the different types of database technology resources;
generating, using the metadata, a role maintenance user interface for assigning the first role to users of the application;
receiving, using the role maintenance user interface, attribute values for creating an instance of the first role for a first user;
creating the instance of the first role for the first user based on the received attribute values and the declarative access control restrictions;
receiving, by the access control system and when the first user is logged into the application, a request from the application for the user to access the database technology resource;
generating executable access control statements based on the declarative access control restrictions and the attribute values; and
applying, by the access control system, the executable access control statements to the database technology resource when accessing the database technology resource, to implement the declarative access control restrictions in the database technology resource.

2. The computer-implemented method of claim 1, wherein the application developer is not aware of the executable access control statements applied to the database technology resource.

3. The computer-implemented method of claim 1, wherein the executable access control statements are not included in the application.

4. The computer-implemented method of claim 1, wherein the role maintenance user interface is automatically generated based on the metadata.

5. The computer-implemented method of claim 1, wherein the role maintenance user interface is manually generated by a user interface developer.

6. The computer-implemented method of claim 5, wherein the user interface developer is not aware of the executable access control statements applied to the database technology resource.

7. The computer-implemented method of claim 1, wherein the metadata is defined by a technology developer of a centralized framework.

8. The computer-implemented method of claim 7, wherein the technology developer is not aware of the declarative access control restrictions received from the application developer.

9. A non-transitory, computer-readable medium storing one or more instructions executable by a computer system to perform operations comprising:
receiving, from an access control system, metadata that describes access control capabilities of a database technology resource, wherein the metadata is from a metadata model that describes access control capabilities of different types of database technology resources;
receiving, from an application developer, declarative access control restrictions for accessing data of the database technology resource by users of an application that have a first role, wherein the declarative access control restrictions are specified using the metadata and are different from different types of executable access controls statements used by the different types of database technology resources;
generating, using the metadata, a role maintenance user interface for assigning the first role to users of the application;
receiving, using the role maintenance user interface, attribute values for creating an instance of the first role for a first user;
creating the instance of the first role for the first user based on the received attribute values and the declarative access control restrictions;
receiving, by the access control system and when the first user is logged into the application, a request from the application for the user to access the database technology resource;
generating executable access control statements based on the declarative access control restrictions and the attribute values; and
applying, by the access control system, the executable access control statements to the database technology resource when accessing the database technology resource, to implement the declarative access control restrictions in the database technology resource.

10. The computer-readable medium of claim 9, wherein the application developer is not aware of the executable access control statements applied to the database technology resource.

11. The computer-readable medium of claim 9, wherein the executable access control statements are not included in the application.

12. The computer-readable medium of claim 9, wherein the role maintenance user interface is automatically generated based on the metadata.

13. The computer-readable medium of claim 9, wherein the role maintenance user interface is manually generated by a user interface developer.

14. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, from an access control system, metadata that describes access control capabilities of a database technology resource, wherein the metadata is from a metadata model that describes access control capabilities of different types of database technology resources;
receiving, from an application developer, declarative access control restrictions for accessing data of the database technology resource by users of an application that have a first role, wherein the declarative access control restrictions are specified using the metadata and are different from different types of executable access controls statements used by the different types of database technology resources;

generating, using the metadata, a role maintenance user interface for assigning the first role to users of the application;

receiving, using the role maintenance user interface, attribute values for creating an instance of the first role for a first user;

creating the instance of the first role for the first user based on the received attribute values and the declarative access control restrictions;

receiving, by the access control system and when the first user is logged into the application, a request from the application for the user to access the database technology resource;

generating executable access control statements based on the declarative access control restrictions and the attribute values; and applying, by the access control system, the executable access control statements to the database technology resource when accessing the database technology resource, to implement the declarative access control restrictions in the database technology resource.

15. The computer-implemented system of claim 14, wherein the application developer is not aware of the executable access control statements applied to the database technology resource.

16. The computer-implemented system of claim 14, wherein the executable access control statements are not included in the application.

17. The computer-implemented system of claim 14, wherein the role maintenance user interface is automatically generated based on the metadata.

* * * * *